United States Patent [19]
Guillen et al.

[11] Patent Number: 5,632,033
[45] Date of Patent: May 20, 1997

[54] VARIABLE RESOLUTION METHOD AND ARRANGEMENT

[75] Inventors: Juan Guillen, Russell; James M. Leask, Canata, both of Canada

[73] Assignee: Sybase, Inc., Emeryville, Calif.

[21] Appl. No.: 184,497

[22] Filed: Jan. 18, 1994

[51] Int. Cl.$^6$ .................................................... G06F 9/45
[52] U.S. Cl. .................................................... 395/685
[58] Field of Search .................................................... 395/700

[56] References Cited

U.S. PATENT DOCUMENTS

| | | | |
|---|---|---|---|
| 5,093,916 | 3/1992 | Karp et al. | 395/700 |
| 5,265,206 | 11/1993 | Shackelford | 395/200 |
| 5,276,816 | 1/1994 | Cavendish et al. | 395/275 |
| 5,297,284 | 3/1994 | Jones et al. | 395/700 |
| 5,418,964 | 3/1995 | Conner et al. | 395/700 |
| 5,437,025 | 7/1995 | Bale et al. | 395/600 |

OTHER PUBLICATIONS

Napier, John C, "Build a Strong Foundation to Program in C++" (Cover Story) EDN, v 37, N22, p. 112(8) Oct. 29, 1992.

*Primary Examiner*—Alvin E. Oberley
*Assistant Examiner*—St. John Courtenay, III
*Attorney, Agent, or Firm*—John A. Smart; David N. Slone

[57] ABSTRACT

Method and arrangement for dynamic, run-time alteration of pre-set variable space relationships by run-time GUI modification of object connections associated with the variable spaces. Arbitrary linkages between all variable spaces are established prior to runtime to allow initial conditions for variable resolution irrespective of anticipated or actual object connections. Thus all variables associated with objects are prespecified and provided with initial values, so long as a value has been assigned to the variable in some object. When actual object relationships are indicated at run-time, these effect new variable space linkages. The initial and subsequent linkages are effected with pointer addresses within the respective variable spaces.

13 Claims, 3 Drawing Sheets

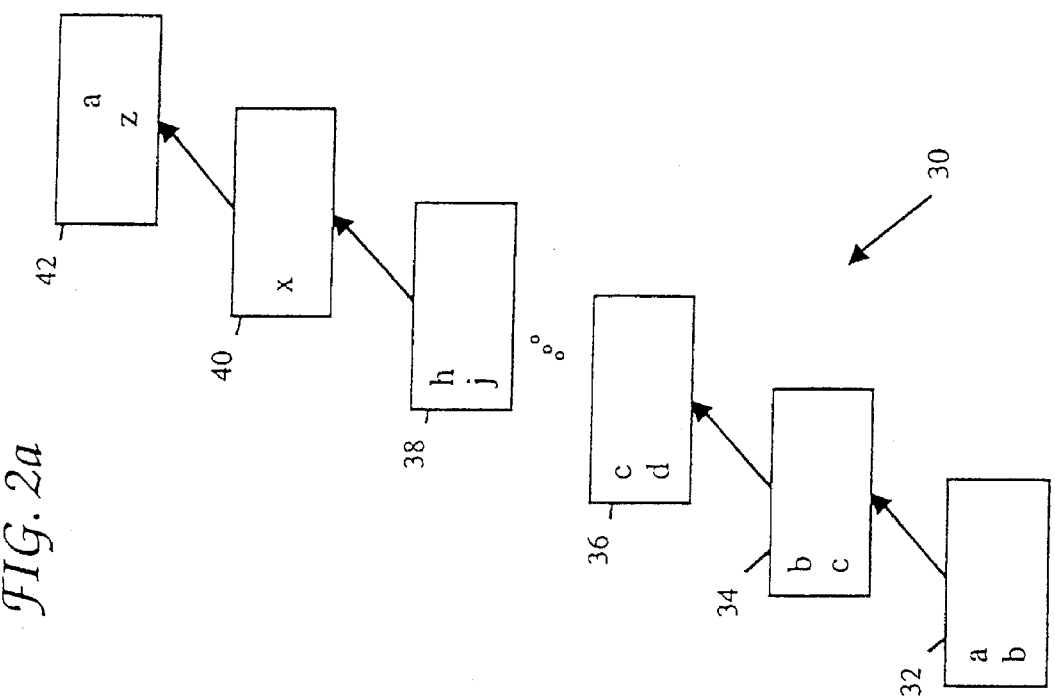

FIG. 4
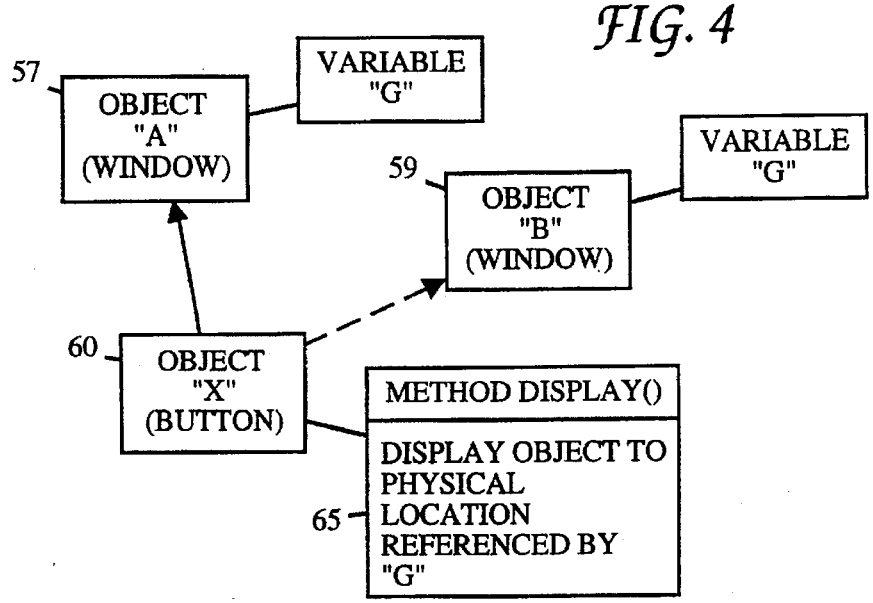
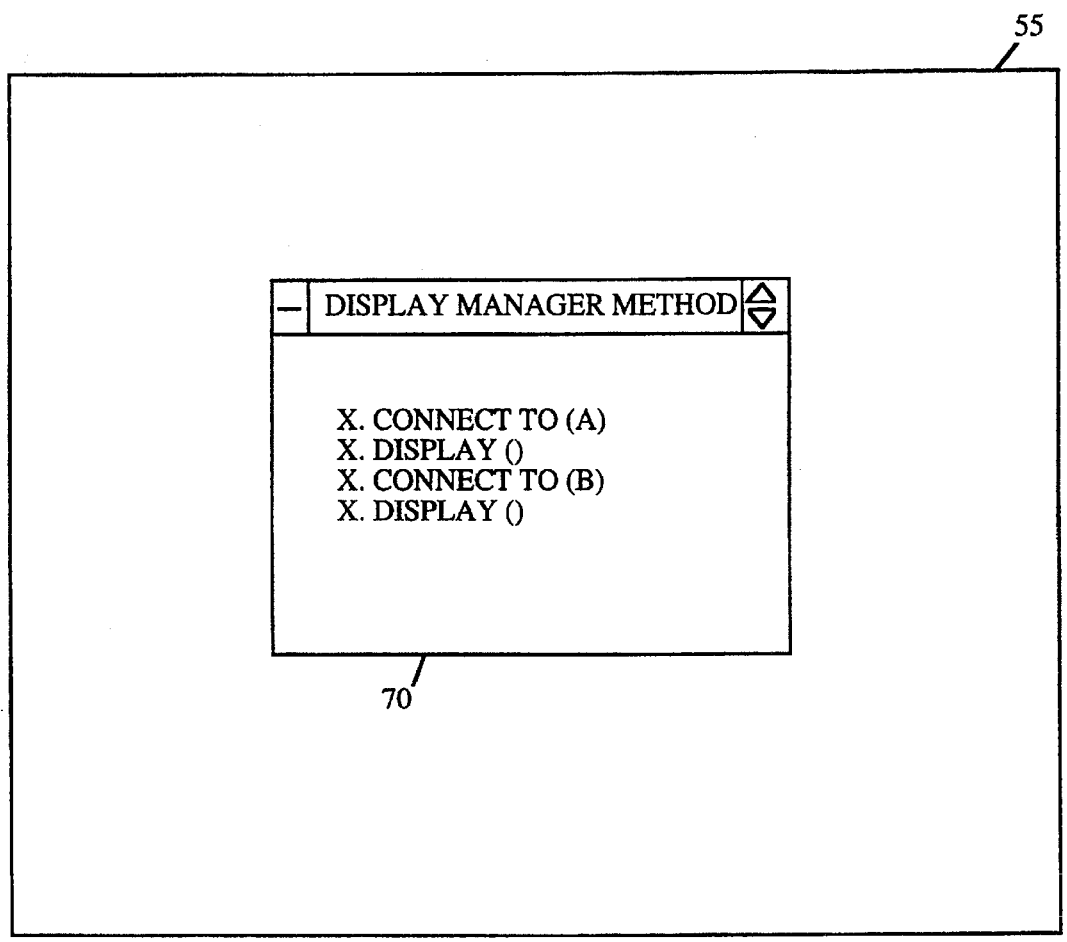
FIG. 5

VARIABLE RESOLUTION METHOD AND ARRANGEMENT

CROSS-REFERENCE TO RELATED APPLICATIONS

This application is related to co-pending patent applications each of them filed on Jan. 18, 1994 and having the same inventorship as herein, and respectively entitled "Object Oriented Dispatch and Supercall Process and Arrangement," "Alternate Dispatch Variable Process and Arrangement for Run-Time Message Redirection and Enablement of Selected Object Oriented Methods," and "Compilation and Virtual Machine Arrangement and Process for Source Code Including Pre-Runtime Executable Language Constructs." These co-pending patent applications have respective Ser. Nos. 08/184,492, 08/183,478, and 08/183,480. These patent applications are assigned to the same assignee as herein, and are incorporated herein by reference in their entirety.

BACKGROUND OF THE INVENTION

This invention relates to name space structure and variable resolution methods and arrangements in object oriented systems.

Object oriented systems rely upon the linkage of variable spaces to permit resolution of the value of particular variables employed in methods defined within objects employed in object oriented systems. The particular methods defined within an object can be executed provided the meanings of variables associated with the methods to be executed are determinable. A variable may be specified within the same object which defines a particular method. Moreover, the variable may also be specified in a linked variable space or object.

Accordingly, when a message is sent to a particular object to execute or evoke a particular method, the method is capable of immediate, run-time execution. However, if the particular variables required by the method for execution are not locally defined or capable of determination, reliance upon the inherent capabilities of object oriented systems is required in order to permit variable scoping and name resolution with respect to the particular variables.

The relationships between objects are typically expressed lexically, that is by definition. Such definitions can be expressed prior to run-time, during compilation of the object oriented system for example. The connections, linkages, and relationships between objects need not be organized initially in a very intelligent or meaningful way. In fact, an arbitrary interconnection scheme is typically produced prior to run-time, during compilation, in order to establish a sufficient level of order between the various objects in the object oriented system, and to enable progress toward the actual accomplishment of program execution.

By way of an example, a number of objects which are capable of being physically viewed on a computer monitor can be selected. Accordingly, when an object such as a window structure, for example, is displayed on a computer monitor, with another object, such as a button, for example, the two objects can be superimposed over each other. Thus, the two objects, a window and a button become visually related by superimposition on a computer monitor. Fundamentally, this connection or relationship is a lexical relationship, pre-established prior to run-time. The two objects, the window and the button are visually linked by the overlap of their respective images. Further, they are linked in terms of the underlying object oriented system, in that the method which invokes the display of the respective images relies upon a variable specifying the location of the display of the images. More particularly, the variable location for display of the "OK" button was specified to be within the physical boundaries of the GUI window constituting another object of the object system.

The objects employed in object oriented systems are software architectural elements having modifiable characteristics. Objects can be characterized with particular methods, variables, tables, and values. Some objects remain transparent to the user, while others are expressed affirmatively on the computer screen. As noted above, a common example of frequently employed objects in a graphical user interface (GUI) environment are windows and buttons. By moving the cursor over a button and double clicking, specific methods associated with the button object can be activated. Further, it is known that methods contained in objects are dependent upon variables, strings, and values. Typically the methods are organized in tables, which may for example be called dispatch tables. A particular object may define a plurality of methods. An example of a method which can be defined in an object is the display method, which is specified by the words, "method: display ( )." This method displays a defined object at a physical location which may be referenced by a variable such as "G," for example. The variable G may be lexically defined at a selected time prior to execution. When the display method is invoked, the selected object is displayed at a predetermined location referenced by variable "G."

The establishment of variable specification within a particular object in which the method relying upon the variable resides is limited by the ability of the object oriented system during variable resolution and name space scoping to determine the specification of a needed variable by upward chaining through the class definitions, and, if required, the superclass definitions. The scoping and resolution effort typically proceeds level by level, hierarchically, until the variable's meaning is defined. The scoping effort follows the preset, typically arbitrary linkages between objects and classes which have been established during the compilation period of the particular object oriented system. Encapsulation continues to have meaning in that the scoping activity is limited to the lowest level at which variable resolution is in fact enabled. Thus, the variable being scoped may be differently defined or specified throughout the object oriented system. However, the particular application specific meaning that the variable takes on is set by the layered hierarchy established by inheritance and the bounds of the object which invokes the methods of a particular message.

It is an object of the invention to permit both lexical and dynamic (i.e., run-time) variable scoping in object oriented GUI controlled computer operations.

Additionally, it is an object of the invention to promote efficiency and flexibility in the processing and implementation of object relationships.

SUMMARY OF THE INVENTION

In particular, according to the invention herein, links between selected objects and their associated variables and variable name spaces are capable of being established, broken, and/or modified. According to one version of the invention, this can be accomplished by physical user interaction through a graphical user interface (GUI) immediately prior to run-time and after source code compilation. As a result of the creation and modification of various relationships between objects, variables, and variable name spaces at this time prior to execution, when the particular compiled software code is in fact actually executed during run-time, a modification of output virtual and physical effects is produced and enabled.

For example, the invention herein can be implemented in the case of a selected method associated with an established object in the software program to be run. The software program may call for the visual display of an array of physical signals and images in the nature of an "OK" button. The precise location of the OK button for display on a computer hardware monitor may, however, be left for specification in the method in accordance with a particular location variable "G." Because of the arbitrary linkages established during compilation of the software, the variable may be defined to point to a particular location on the screen. This may be accomplished by modification of the linkages between variable name spaces just prior to run-time, by active user intervention on a GUI to respecify object linkages. The connection or reconnection between objects can be accomplished symbolically, by linking actual physical images on the computer monitor according to operations with predefined graphical tools. Alternatively, the modification in linkages between objects can be accomplished by suitable code entries made in with an appropriate software manager or display manager, according to user selection.

According to the invention, the arbitrary pre-run-time linkage of variable spaces is permitted to enable variable resolution on the fly, while accommodating dynamic changes in the linkages between variable spaces at run-time. The linkages are determined by providing address pointers in the objects associated with the particular variable spaces. The variable spaces are created according to well known methods, by specification of the variables as part of methods associated with particular objects. The linkages between variables are established conventionally by use of pointer and addressing mechanisms common to the prior art.

According to the invention, a method and arrangement for dynamic, run-time alteration of pre-set variable space relationships by run-time GUI modification of object connections associated with the variable spaces are provided. Arbitrary linkages between all variable spaces are established prior to runtime to allow initial conditions for variable resolution irrespective of anticipated or actual object connections. Thus all variables associated with objects are prespecified and provided with initial values, so long as a value has been assigned to the variable in some object. When actual object relationships are indicated at run-time, these effect new variable space linkages. The initial and subsequent linkages are effected with pointer addresses within the respective variable spaces.

Without modification of the linkages in accordance with the invention results in direct variable resolution during variable scoping operations which depends upon the arbitrary linkages established prior to run-time during compilation of the source code defining the concerned objects containing methods and variables subject to scoping and resolution.

These and other features and advantages of the present invention will become apparent upon reading the following detailed descriptions and studying the various figures of the drawings.

BRIEF DESCRIPTION OF THE DRAWINGS

FIG. 2a is an illustration of the interpretation of variables associated with the objects and interpreted in accordance with the variable spaces expressed in FIG. 1;

FIG. 2b is a table of variables which can be defined from the perspective of given levels of the variable spaces expressed in connection with FIG. 2a;

FIG. 4 is a diagram of the modification of the relationship between a selected object B and selected first and second windows C and D; and FIG. 5 is an illustration of a computer monitor having open the window of the Display Manager Method example of the invention which is effective for enabling the run-time, dynamic selection of an object for association or connection with another object.

DETAILED DESCRIPTION OF THE PREFERRED EMBODIMENTS

Figure 1:
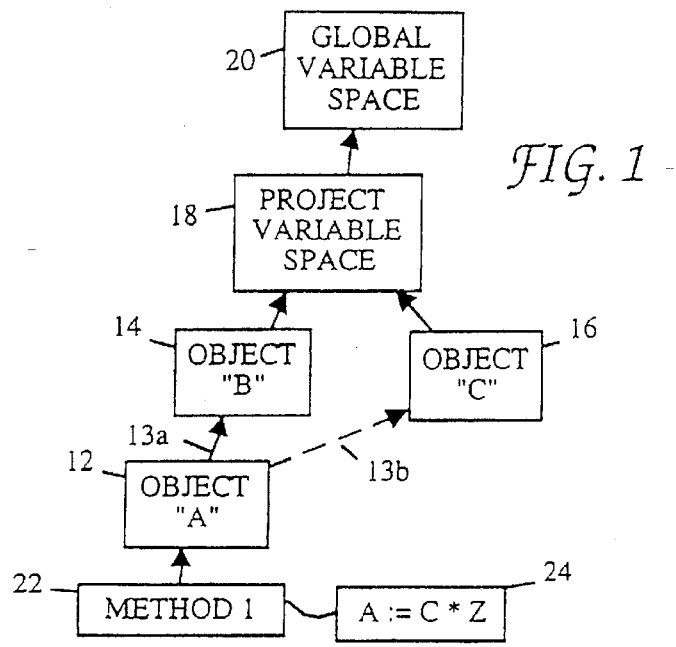
FIG. 1 shows the architecture and relationships between objects and variable spaces which are subject to redetermination according to the invention herein.

FIG. 1 shows the architecture and relationships between variable spaces and objects of an object oriented system 10 according to the invention herein. The indicated objects and variable spaces have relationships and linkages as indicated in FIG. 1, based upon arbitrary established prior to run-time during a compilation period with respect to source code effective for actual definition of the various objects and variable spaces indicated. The variables referred to with respect to the indicated objects are capable of specification at predetermined variable spaces associated with the indicated objects in object system 10.

More particularly, FIG. 1 shows object system 10 including objects A, B, and C, respectively also designated as objects 12, 14, and 16. Thus, object A is also known as object 12; object B is also known as object 14; and object C is also known as object 16. Object system 10 further includes a project variable space 18 and a global variable space 20.

Object system 10 shown in FIG. 1 further includes a method 1, respectively block 22, which references object A variable space (i.e., object variable space 12) and includes a function or variable expression "a:=c*z," which herein is referenced as variable expression 24. Variable "z" is required to be specified or resolved by variable scoping and name space resolution in order for method "1" to be executed. Object A will desire to execute method Z when it receives a message from another object specifying the execution of method 1. This initiates an attempt to resolve the meaning of variable z.

The objects in FIG. 1 have specific, predetermined relationships, as suggested above. Specifically, Object A variable space (i.e. object variable space 12) refers to either object B variable space or object C variable space, but not to both of them, at any given time. In other words, the indicated connections between the variable spaces of objects A and B, and A and C, are mutually exclusive links. This alternative relationship is suggested by fixed arrow 13a and phantom arrow 13b, as indicated in FIG. 1, connecting the variable space of object A respectively to the variable spaces of objects B and C.

However, both the variable spaces of objects B and C reference variable space 18, and project variable space 18 in turn references global variable space 20. For purposes of this disclosure, the connection between the variable spaces of objects A and B is considered to have been lexically established prior to run-time. In accordance with this invention, the connection between the variable spaces of object A and object C is a relationship which is capable of establishment at run-time. This relationship or connection between the variable spaces of objects A and C effectively supersedes or replaces the connection between the variable spaces of objects A and B, so that when the variable spaces of objects A and C are connected, no connection between the variable spaces of objects A and B is said to be in effect. Since the relationship between the variable spaces of objects A and C occurs at runtime, it is said to be a dynamic relationship.

FIG. 2a illustrates a variable space system 30 including a plurality of variable spaces 32, 34, 36, 38, 40, and 42. This plurality of variable spaces respectively corresponds to a number of predetermined variables which as defined or established in connection with particular entities of object oriented system 10. In particular, variable space 32 contains specification information related to method 12 of object system 10 shown in FIG. 1. FIG. 2a suggests that two variables, variable a and variable b, are specified by method z with respect to variable name space 34. FIG. 2b further suggests that variables b and c are specified in an object at level 2, namely object 12 of FIG. 1.

These respective variable spaces are associated with the objects and class objects expressed in FIG. 1, as will be discussed. All of the indicated variable spaces are locations in a selected computer memory which executes selected methods in accordance with the invention herein. The indicated variable spaces are classified according to a selected sequence of levels, according to which level 1 includes method variable space 32; level 2 includes object variable space 34; level 3 includes object variable space 36, level 4 includes object variable space 38, level 5 includes project variable space 40, and level 6 includes global variable space 42.

FIG. 2b is a table 50 of variables which can be defined from the perspective of given levels of the variable spaces expressed in connection with FIG. 2a. In particular, variables a, b, c, d, h, j, and z are references in the various levels 1–6. Referring back to FIG. 2a, it is clear that method variable space 32 references variables "a" and "b." Further, first object variable space 34 references variables "b" and "c." Next, second object variable space 36 references variables "c" and "d." Third "object variable space 38 in turn references variables "h" and "j." The project entity variable space 40 references variable "x." Finally, global entity variable space 42 references variables "a" and "z." As shown in FIG. 2b, if variable value resolution is sought as to variable "a," by reference to method variable space 32, resolution can be accomplished at the same level, i.e., level 1. Similarly, since both variables "a" and "b" reside at level 1, variable resolution as to either of these variables can occur at this lowest level, i.e., level 1. However, if variable resolution is sought at level 1 for variables c, d, h, j, x, or z, this will be accomplished only by reference to a higher level, which for the indicated variables will be respectively levels 2, 3, 4, 4, 5, and 6. Similarly, if variable resolution is sought as to level 2 and variables b, c, d, h, j, x, z, or a, this can be accomplished by reference respectively to levels 2, 2, 3, 4, 4, 5, 6, and 6. If variable resolution is sought from level 3 as to variables c, d, h, j, x, z, or a,, reference to respective levels 3, 3, 4, 4, 5, 6, and 6 is recommended. Further, for variable resolution from level 4 as to variables h, j, x, z, or a, reference to respective levels 4, 4, 5, 6, and 6 is recommended. For variable resolution from level 5 as to variables x, z, or a, respective reference to levels 5, 6, and 6 is recommended. Finally, if variable resolution as to variables z or a is sought at level 6, this is in fact the level at which resolution can be accomplished.

Figure 3:
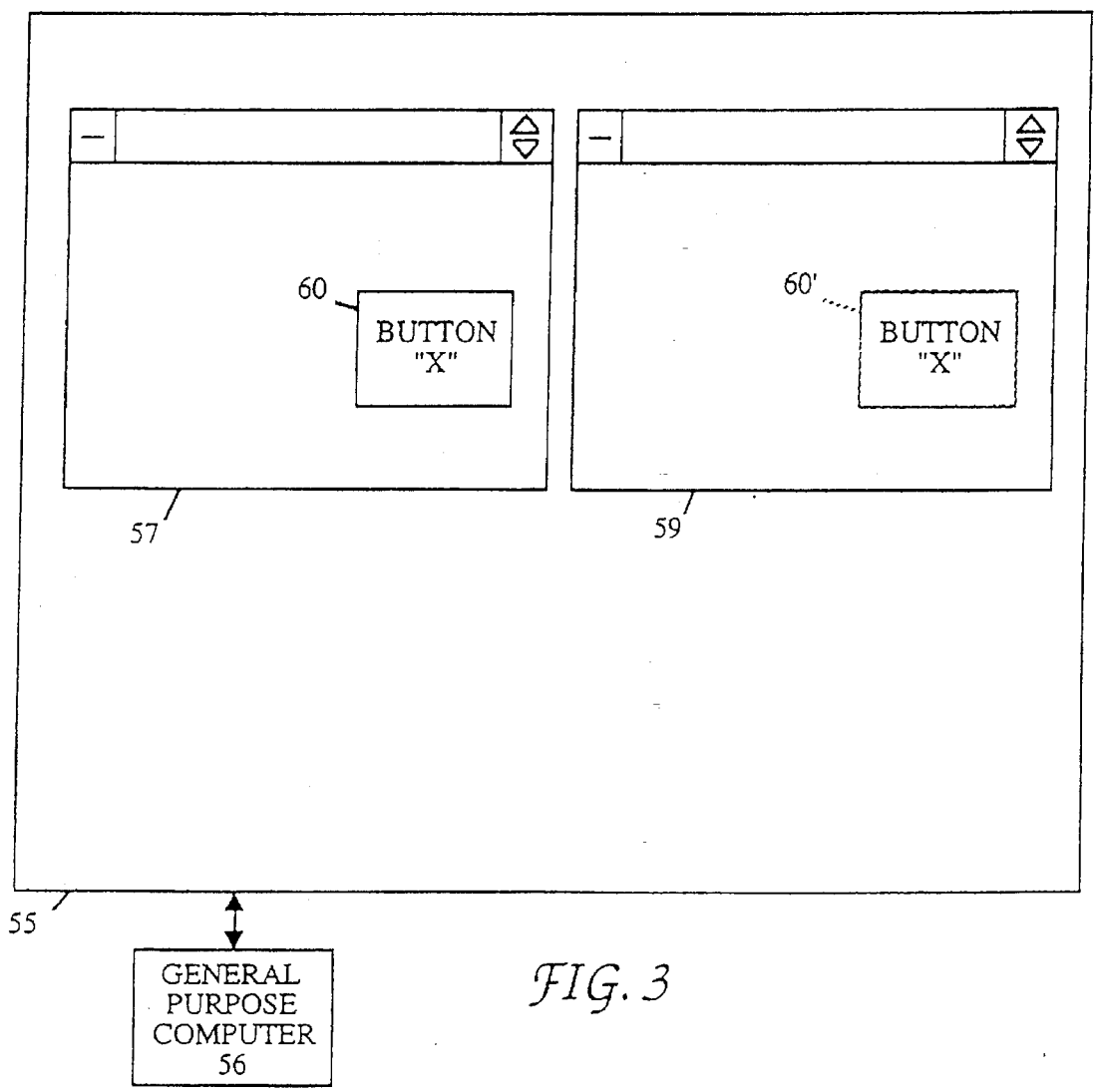
FIG. 3 illustrates a graphical user display (GUI) monitor containing a window expressing an object definition specifying a button initially expressed first in one window and then in the next, in accordance with an example according the invention herein wherein different variable scoping effects the placement of the button first in window A and then in window B.

FIG. 3 illustrates a graphical user display (GUI) monitor 55 connected to a general purpose computer 56 for running the processes of the invention herein. The general purpose computer may for example be an Intel 80486 microprocessor based personal computer (PC) system. Monitor 55 contains first and second windows 57 and 59 which are respective window objects A and B. Further, in each of first and second windows 57 and 59, the impression of a third object is indicated. This third object is a button X, referred to herein as object X or button X, as the case may be. For convenience, button X is also referred to as button 60. Button X is shown in phantom in window object B to suggest accomplishment of variable resolution according to an alternate variable resolution approach, while button X is shown in regular depiction in window object A to indicate the standard approach to variable resolution has been undertaken to implement the indicated depiction of button X on window 57.

Accordingly, with respect to FIG. 3, button X will be displayed on either window A or window B, depending upon the specific implementation of variable resolution conducted according to the invention herein. The resolution of a particular variable to either a first or second result will determine the outcome of processing a method which effects the display of a selected button on GUI screen 55. In this case, the particular method calls for display of the button object X within a selected window object. In the case of one implementation of variable resolution, the button object X is produced on or within window 57. In the case of another implementation of variable resolution, the button object X is produced (as shown in phantom) on or within window 59. The user or programmer can thus directly influence the location of button object presentation at or during software runtime. With reference to FIG. 1, the action of the user or programmer (not shown) is effective for shifting the linkage between OBJECT A from OBJECT B to OBJECT C. Thus, the actual linkage between OBJECTS A and B by vector 13a will be replaced through user produced action by phantom vector 13b, which produces a linkage between OBJECT A and OBJECT C. This new linkage of objects may for example cause the button object to be linked with and produced as an image over one window object rather than another.

FIG. 4 is a diagram of the modification of the relationship between a selected object X and selected first and second window objects A and B. According to the example depicted in FIG. 4, object X (i.e., button X) can refer to either of objects 57 or 59. Under initial conditions, reference may first be done to either of the objects, and reference to the other of the objects can be made dynamically at run-time. Notably, each of objects 57 and 59 specifies variable G, but differently of course. The specification of variable G in the context of object A is effective for physically locating the image of button X at a predetermined location within window A; similarly, the specification of variable G in the context of object B is effective for physically locating the image of button X at a predetermined location within window B. Preferably, button X is not physically located within both windows A and B at the same time, while, in actuality, nothing would forbid this, if properly coded. It is further to be noted that object X, the button object, is characterized with a particular method, in this case "Method Display( ),"

which is noted at box 65 for convenience The effect of this method is to display the button object at a location referred to by variable G.

FIG. 5 is an illustration of a computer monitor 55 having open a window 70 of the Display Manager Method example of the invention effective for enabling the run-time, dynamic selection of an object for association or connection with another object. In the case of the example of FIG. 4, the selection was made between objects A and B. Window 70 shows four lines of code, respectively:

"x. connect to (A)

"x. display ( )

"x. connect to (B)

"x. display ( )

The first line, "x. connect to (A)" effects the connection of object X to object A. The next line "x. display ( )" is effective for displaying object X in the target object. In other words, button X will be displayed in window A, at a suitable location, indicated by variable G which is specified in the definition of object A which is presented on monitor 55 as object A. The third line, "x. connect to (B)" effects the connection of object X to object B. The next line "x. display ( )" is effective for displaying object X in the target object. In other words, button X will be displayed in window B, at a suitable location, indicated by variable G which is specified in the definition of object B which is presented on monitor 55 as object B.

The example given with respect to name space scoping and variable resolution applies specifically to the GUI environment, and it shows an implementation of the invention according to which variable resolution is accomplished by direct, physical user interaction with the GUI, an interaction which results in the case of the example in a physical signal result or image being produced on a computer screen. However, the method and architecture implemented is applicable as well to accomplish intermediate or virtual results within a general purpose computer which lead to other results, which at a later stage may produce results capable of non-trivial physical manifestation. The accomplishment of useful virtual and intermediate results is considered to fall within the scope of the invention herein, particularly when initiated or caused by physical acts of the user operating through a GUI.

In summary, according to the method and arrangement of the invention, the dynamic, run-time alteration of pre-set variable values in capable of by run-time modification by the resetting of object connections associated with the variable name spaces. Arbitrary linkages between all variable spaces are initially established during source code compilation and prior to runtime to allow initial conditions for variable resolution irrespective of anticipated or actual object connections. Thus, all variables associated with objects are prespecified and provided with initial values, so long as a value has been assigned to the variable in some object. When actual object relationships are indicated at ran-time, these effect new variable space linkages. The initial and subsequent linkages are effected with pointer addresses within the respective variable spaces.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. A process of adjusting linkages between the variable spaces of selected objects of different classes belonging to an object system, said process comprising the steps of:
   (a) establishing first, second, and third objects in said object system, said first, second, and third objects having respectively associated first, second, and third variable spaces for specifying the values of selected variables with selected methods, said first, second, and third objects belonging to different object classes;
   (b) defining a particular method in association with a selected one of said first, second, and third objects, said particular method being defined by at least a single variable and permitting execution of said particular method upon resolution for the value of said at least a single variable, said resolution determining a storage location for a value of said at least a single variable;
   (c) establishing, prior to run-time execution, a selected arrangement of linkages between variable spaces defined with respect to the objects and corresponding variable spaces of said object system, said selected arrangement of linkages initially determining a storage location where said particular method is to find a value for said at least a single variable when said particular method is executed;
   (d) in response to user input during run-time execution, conducting run-time modifications to the linkages between variable spaces; and
   (e) executing said particular method based upon the results of variable resolution conducted with reference to the linkages between said variable spaces based upon said run-time modifications, whereupon said selected arrangement of linkages, including said run-time modifications, determines the storage location where said particular method finds a value for said at least a single variable when said particular method is executed.

2. The process of claim 1, wherein initial linkages between variable name spaces are established before run-time.

3. The process of claim 1, wherein the modifications to variable space linkages are accomplished by explicitly specifying object-to-object linkages.

4. A process of run-time variable specification comprising the steps of:
   (a) establishing an object oriented system including a plurality of objects arranged according to a predetermined hierarchical structure, selected ones of said plurality of objects having predetermined methods expressed as functions of selected variables, said objects being associated with corresponding variable spaces;
   (b) establishing, prior to run-time execution, linkages between said variable spaces, said linkages initially determining the value of a variable in a selected method by referring to the variable space associated with the object having the selected method, and to other variable spaces linked to said variable space;
   (c) in response to user input during run-time execution, modifying at least one of the linkages between variable spaces that affect a particular method of a particular object; and
   (d) thereafter, causing said particular object to execute said particular method based upon the results of variable resolution conducted with reference to the linkages between said variable spaces based upon said run-time modifications, whereupon said linkages, as modified in said step (c), determine the storage location where said particular method finds a value for said particular variable when said particular method is executed.

5. The process of claim 4, wherein the linkages between variable name spaces are made by the establishment of an address value within another variable name space.

6. A process of making a variable space linkage between first and second objects and then between said first object and a third object, the first, second, and third objects comprising a predetermined object system, said first object including a selected method definition dependent upon the value of a selected variable, and information contained within said second object and information contained within said third object each being sufficient to independently resolve the value of the selected variable, said process comprising the steps of:

(a) in association with a compilation phase, establishing a link between the variable spaces associated with said first and second objects, said link determining an initial storage location for a value of said selected variable;

(b) in association with a run-time phase after the compilation phase, receiving user input specifying establishing a link between the variable spaces associated with said first and said third object, said link determining a different storage location for a value of said selected variable; and (c) thereafter, invoking the selected method and resolving the value of the selected variable at said different storage location in the variable space associated with said third object, whereupon said link between the variable spaces associated with said first and said third object in association with said run-time phase causes said different storage location to provide a value of said selected variable when the selected method is executed.

7. The process of claim 6, further comprising breaking the link between said first and second objects.

8. The process of claim 6, further comprising execution of said method in connection with either said first or said second object.

9. The process of claim 6, wherein said linkages between variable spaces are accomplished with pointers and addresses.

10. The process of claim 6, wherein said method is directed toward the relationship of said first object with said second and third objects.

11. The process of claim 6, wherein said method is directed toward the visual presentation of said first object and the visual presentation of said second or said third objects.

12. The process of claim 6, wherein said method is directed toward the visual presentation of said first object and the visual presentation of said second and said third objects.

13. In a system for creating and using an object-oriented program created from object-oriented source listings in a computer wherein the source listings comprise at least first and second object-oriented classes, each class has data and methods, an object created from a given class has an associated variable space for resolving the values of variables required for execution of the method, said associated variable space determining storage locations for values of said variables, and the program operates, during run-time execution, in response to messages received by objects created from said classes to execute methods for said classes, a process for invoking a given method of a first object created from said first class using values of variables specified in the variable space associated with a second object created from said second class when a message seeking to invoke the given method is received by said first object, the process comprising the steps of:

displaying representations of said first and second objects on a graphical user interface;

receiving, during run-time execution of said program, user input for establishing a connection from said first object to said second object specifying that methods of said first object can be executed using values of variables stored in locations specified by the variable space associated with said second object;

in response to receiving said user input, storing in an alternate variable space parameter of said first object information describing the connection to said variable space associated with said second object;

upon receipt by said first object of a message calling a particular method requiring at least one particular variable, determining values of said at least one particular variable by accessing said locations specified by the variable space associated with said second object, and executing the particular method using the values, so determined.

* * * * *